United States Patent
Feinberg et al.

(10) Patent No.: US 6,563,979 B2
(45) Date of Patent: May 13, 2003

(54) AUTOMATICALLY SWITCHED REDUNDANT SWITCH CONFIGURATIONS

(75) Inventors: Lee Daniel Feinberg, Silver Spring, MD (US); John Hagopian, Harwood, MD (US)

(73) Assignee: Dorsal Networks, Inc., Columbia, MD (US)

( * ) Notice: Subject to any disclaimer, the term of this patent is extended or adjusted under 35 U.S.C. 154(b) by 0 days.

(21) Appl. No.: 09/886,409

(22) Filed: Jun. 22, 2001

(65) Prior Publication Data

US 2002/0197004 A1 Dec. 26, 2002

(51) Int. Cl.$^7$ .................................................. G02B 6/28
(52) U.S. Cl. .............................. 385/24; 385/15; 385/16; 385/17; 359/110
(58) Field of Search ................................ 385/24, 15–18

(56) References Cited

U.S. PATENT DOCUMENTS

| | | | | |
|---|---|---|---|---|
| 5,717,796 A | * | 2/1998 | Clendening | 359/119 |
| 5,764,405 A | | 6/1998 | Alphonsus | 359/341 |
| 5,896,474 A | * | 4/1999 | Van Deventer et al. | 370/216 |
| 5,912,761 A | | 6/1999 | Jander et al. | 359/341 |
| 5,926,263 A | | 7/1999 | Lynch et al. | 356/73.1 |
| 5,966,206 A | | 10/1999 | Jander | 356/73.1 |
| 5,969,833 A | | 10/1999 | Jensen | 359/110 |
| 6,025,949 A | | 2/2000 | Anderson | 359/179 |
| 6,028,684 A | | 2/2000 | Kidorf | 359/110 |
| 6,057,948 A | * | 5/2000 | Mizrahi | 359/110 |
| 6,061,156 A | * | 5/2000 | Takeshita et al. | 359/117 |
| 6,134,032 A | | 10/2000 | Kram et al. | 359/110 |
| 6,134,033 A | | 10/2000 | Bergano et al. | 359/122 |
| 6,137,604 A | | 10/2000 | Bergano | 359/124 |
| 6,211,985 B1 | | 4/2001 | Anderson | 359/174 |
| 6,304,351 B1 | | 10/2001 | Pedersen | 359/130 |
| 6,307,653 B1 | * | 10/2001 | Bala et al. | 359/110 |
| 6,323,981 B1 | | 11/2001 | Jensen | 359/177 |
| 6,327,250 B1 | | 12/2001 | Chen et al. | 370/241 |
| 6,327,400 B1 | * | 12/2001 | Harstead et al. | 385/16 |
| 6,396,969 B1 | * | 5/2002 | Sparks et al. | 359/128 |
| 6,414,771 B2 | * | 7/2002 | Al-Salameh et al. | 359/110 |

OTHER PUBLICATIONS

S. Namiki et al., Abstract, "Recent Advances in Ultra–Wideband Raman Amplifiers" Opto–technology Lab., pp. FF–1–3, and "Fibre–DFB Laser WDM Array" from Tutorial Sessions, SN 34011, p. 142.

Ravi V. Shankar et al., "Managing the Management Communications Network in Optical Transport Systems" in Bell Labs Technical Journal, Oct.–Dec., 1999, pp. 155–170.

N.S. Bergano, "Undersea Amplified Lightwave Systems Design" AT&T Laboratories Pub., pp. 302–335.

AT&T Technical Journal, "Undersea Communications Technology", AT&T Technical Journal, Jan./Feb. 1995, vol. 74, No. 1.

(List continued on next page.)

*Primary Examiner*—Brian Healy
*Assistant Examiner*—Daniel Petkovsek
(74) *Attorney, Agent, or Firm*—Foley & Lardner

(57) ABSTRACT

A branch unit for a fiber optic system that includes a service path and a protection path, whereby the branch unit provides switching to account for problems due to fiber cuts and/or equipment failures that may occur in the fiber optic system. The service and protection paths meet at a branch point of the fiber optic network, or at a network protection equipment (NPE) that is located near a customer interface equipment. A plurality of switches are provided at the branch unit or NPE, along with a detector and a processor, to determine whether any signals are being received from the service path, and if not, to reconfigure the system to accept signals from the protection path.

25 Claims, 8 Drawing Sheets

OTHER PUBLICATIONS

C. de Maindreville et al., Submarine Network Management: Architectural Issues, "Abstract", pp. 573–580.

Bell Labs Technical Journal, Oct.–Dec. 1999, pp. 138–154.

Ellen Brain et al., "Ten Years of Operating Light Wave Systems" pp. 203–209.

I.P. Kaminow, "Optical Fiber Telecommunications IIIB", pp. 101–103.

N.S. Bergano et al., "Polarization Scrambling Improves SNR Performance in a Chain of EDFAs" in OFC 94 Technical Digest Pub., pp. 255–256.

C.A. Siller, Jr. et al., "Sonet SDH—A SourceBook of Synchronous Networking", IEEE Communications Society, pp. 262–265.

* cited by examiner

AUTOMATICALLY SWITCHED REDUNDANT SWITCH CONFIGURATIONS

BACKGROUND OF THE INVENTION

A. Field of the Invention

The invention relates generally to redundant switch configurations, and more specifically to redundant switch configurations that provide both signal loss protection and equipment failure protection.

B. Description of the Related Art

For fiber optic networks, problems in transmitting and receiving signals may be due to equipment failure, such as switch failure, or it may be due to failure of the signal lines, such as the fiber optic lines which provide signals from a source to a destination.

Typically, conventional optical communication systems comprise a receiving node and a transmitting node (Baltimore, Md. and New York, N.Y., for example) connected via optical fiber. Each node contains equipment for communication via optical fiber. Such equipment may include channel equipment and Wavelength Division Multiplex (WDM) equipment. Channel equipment is equipment that transmits and receives via a specific wavelength (or channel). In a conventional system, if a fiber is cut resulting in a loss of signal, the system requires a network element (such as a SONET processor) to determine there is a failure in the digital domain and notify the switch to change state.

Further, switches are utilized to direct signals transmitted by the nodes to various fiber optical cables within a conventional optical communication system. When a switch fails in a conventional system, an operator manually reconfigures the switch to communicate via an alternate channel. The resulting down time from manually switching channels results in a high amount of data loss and an inefficient use of backup resources.

SUMMARY OF THE INVENTION

The present invention is directed to overcoming or at least reducing the effects of one or more of the problems set forth above, as well as other problems found in the prior art.

In a first aspect of the present invention, a fiber optic system is provided comprising a primary transmission path provided from a source, a secondary transmission path provided from the source, and a network protection unit coupled to the primary and secondary transmission paths provided from the source. The network protection unit comprises a first 1×2 switch, a second 1×2 switch, and a third 1×2 switch.

The first 1×2 switch comprises a first input optically coupled to the primary transmission path, a second input optically coupled to the secondary transmission path, and an output. The second 1×2 switch comprises a second input optically coupled to the primary transmission path, a first input optically coupled to the secondary transmission path, and an output. The third 1×2 switch comprises a first input optically coupled to the output of the first switch, a second input optically coupled to the output of the second switch, and an output optically coupled to an output transmission path.

In a first mode of operation, the first and third switches are set to provide the primary signal to the output transmission path. In a second mode of operation, the first and third switches are set to provide the secondary signal to the output transmission path. In a third mode of operation, the second and third switches are set to provide the primary signal to the output transmission path. In a fourth mode of operation, the second and third switches are set to provide the secondary signal to the output transmission path.

In another aspect of the present invention, a fiber optic system is provided comprising a primary transmission path provided from a source, a backup transmission path provided from the source, and a branch unit provided at a meeting point of the primary and backup transmission paths.

The branch unit comprises a first 2×2 switch, a second 2×2 switch, a third 2×2 switch, and a processor. The first 2×2 switch comprises a first input optically coupled to the primary transmission path, a second input optically coupled to the secondary transmission path, a first output, and a second output optically connected to a detector. The second 2×2 switch comprises a second input optically coupled to the primary transmission path, a first input optically coupled to the secondary transmission path, a first output, and a second output optically coupled to a detector. The third 2×2 switch comprises a first input optically coupled to the first output of the first 2×2 switch, a second input optically coupled to the first output of the second 2×2 switch; a first output, and a second output.

The processor receives information from the detectors regarding the detected signal strength at the second output port of the first 2×2 switch and the second output port of the second 2×2 switch. The first 2×2 switch operates in either a first mode that provides input received on its first input to its first output and input received on its second input to its second output, or a second mode that provides input received on its first input to its second output and input received on its second input to its first output. The second 2×2 switch operates in either a first mode that provides input received on its first input to its first output and input received on its second input to its second output, or a second mode that provides input received on its first input to its second output and input received on its second input to its first output. The processor commands the first and second 2×2 switches to operate in one of the first mode of operation and the second mode of operation, based on the information received from the detectors.

In another aspect of the present invention, a fiber optic system is provided comprising a primary transmission path provided from a source, a backup transmission path provided from the source, and a branch unit provided at a meeting point of the primary and backup transmission paths.

The branch unit comprises a first 2×2 switch, a second 2×2 switch, a detector, and a processor. The first 2×2 switch comprises a first input optically coupled to the primary transmission path, a second input optically coupled to the secondary transmission path, a first output, and a second output. The second 2×2 switch comprises a first input optically coupled to the first input of the first 2×2 switch, a second input optically coupled to the second input of the second 2×2 switch, and an output optically coupled to a main transmission path. The detector is optically coupled to an output of the second 2×2 switch. The processor is in communication with the detector for controlling the first 2×2 switch and the second 2×2 switch.

The first 2×2 switch operates in either a first mode that provides input received on its first input to its first output and input received on its second input to its second output, or a second mode that provides input received on its first input to its second output and input received on its second input to its first output. The second 2×2 switch operates in either a first mode that provides input received on its first input to an output, or a second mode that provides input received on its second input to an output. The processor commands the first 2×2 switch and second 2×2 switch to operate in one of the first mode of operation and the second mode of operation, based on the information received from the detector.

In another aspect of the present invention, a method of providing fiber optic signals on a fiber optical network is provided, the method comprising the steps of providing, from a source, a primary signal on a primary transmission path, providing, from the source, a backup signal on a backup transmission path, receiving the primary and backup signals on the primary and backup transmission paths, respectively, and outputting only one of the primary and backup signals onto an output port that correspond to a main optical path, by way of at least two switches, detecting a signal strength on the main optical path, and determining, based on signal strength or quality, whether or not to operate in a first mode of operation, in which the primary signal is provided to the main optical path, or in second mode of operation, in which the backup signal is provided to the main optical path.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
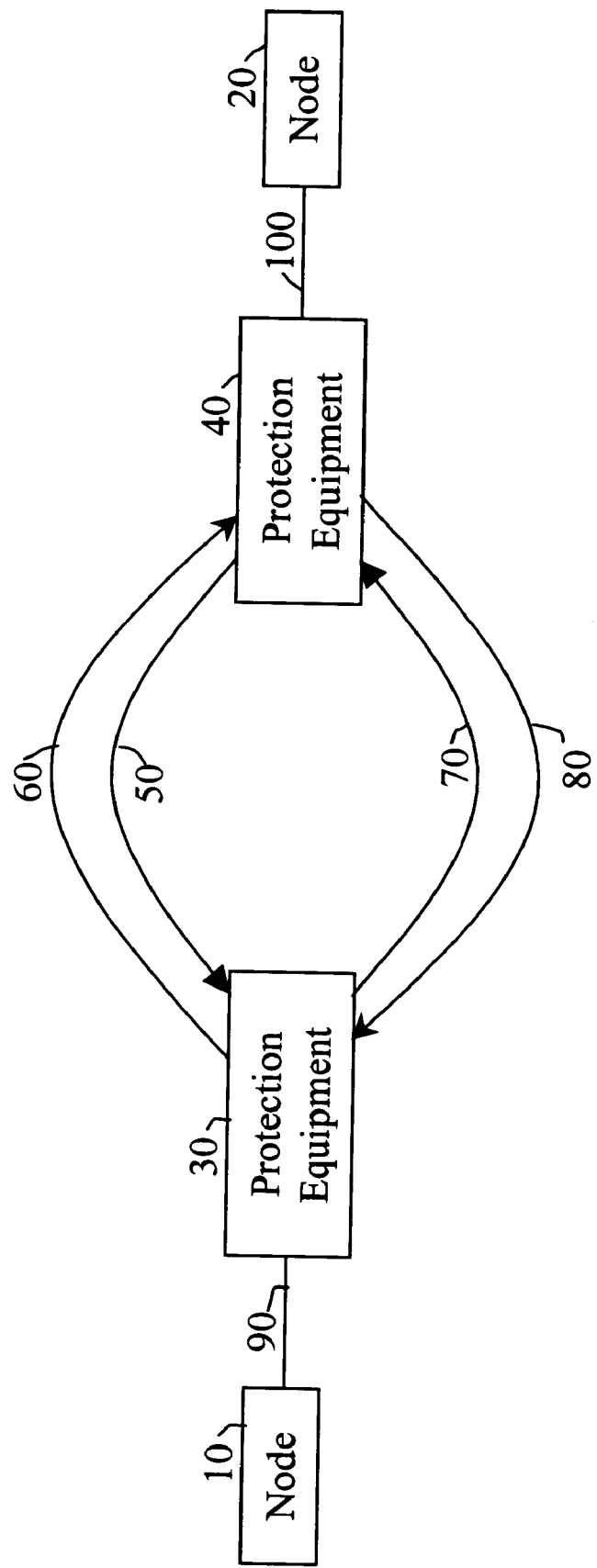
FIG. 1 is a block diagram of a network connection according to the present invention.

An example of a network connection according to the present invention is shown by the block diagram of FIG. 1. Nodes 10 and 20 may be transmitting and receiving nodes separated by a body of water. For example, node 10 may be a node located in Paris, France and node 20 may be a node located in New York, N.Y. Node 10 is optically connected to protection equipment 30 via optical fiber 90. Similarly, node 20 is optically connected to protection equipment 40 via optical fiber 100.

In a first transmit operation mode, node 10 transmits data to node 20 via service transmit optical fiber 60. In a second transmit operation mode, when a fiber cut in service transmit optical fiber 60 occurs, node 10 transmits data to node 20 via protect transmit optical fiber 70.

In a first receive operation mode, node 10 receives data from node 20 via service receive optical fiber 50. In a second receive operation mode, when a fiber cut in service receive optical fiber 50 occurs, node 10 receives data from node 20 via protect receive optical fiber 80.

Protection equipment 30 and 40 provide for switching (typically wave division multiplexed switching) between diversely routed service and protection optical fibers 50, 60, 70, and 80. Protection equipment 30 and 40 typically comprise branch units in relatively close physical proximity to nodes 10 and 20, and may further comprise optical repeaters, amplifiers, and other optical transmission related devices.

Figure 2:
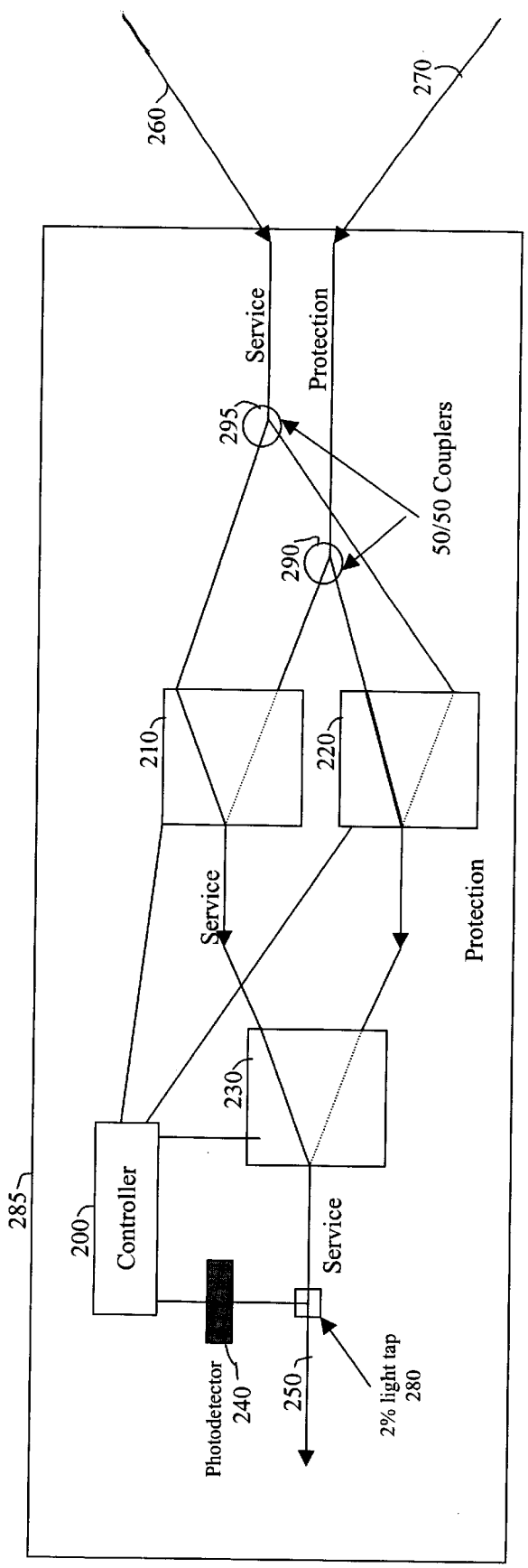
FIG. 2 is a block diagram of a branch unit according to a first embodiment of the invention.

A first embodiment of a fiber optic system is shown by the block diagram of FIG. 2. Branch unit 285, in this block diagram depicted as a receiving branch unit, according to the first embodiment is optically coupled to service receive optical fiber 260 and protect receive optical fiber 270. Service optical fiber 250 is the primary transmission path optically connected to a receiving node. In reference to FIG. 1, service receive optical fiber 260 correlates to service receive optical fiber 50, and protect receive optical fiber 270 correlates to protect receive optical fiber 80. Service optical fiber 250 correlates to a receive path of optical fiber 90.

Service receive optical fiber 260 obtained from a first branch path is optically split via 50/50 optical coupler 295. Split 50/50 service receive optical fiber is optically connected to a first input of a first 1×2 switch 210 and optically connected to a second input of the second 1×2 switch 220. Similarly, protection receive optical fiber 270 obtained from a second branch path is optically split via 50/50 optical coupler 290. Split 50/50 protect receive optical fiber is optically connected to a second input of the first 1×2 switch 210 and optically connected to a first input of the second 1×2 switch 220.

The output of the first 1×2 switch 210 is provided to a first input of a third 1×2 switch 230, and the output of the second 1×2 switch 220 is provided to a second input of the third 1×2 switch 230. The output of the third 1×2 switch 230 is coupled to the primary transmission path 250.

A light tap 280 is provided at the output of the third 1×2 switch 230, and a photodetector 240 is coupled to the light tap 280 to detect an output signal level. Information from the photodetector 240 is provided to a processor or controller 200. Based on the information provided, the processor 200 controls the first, second and third 1×2 switches 210, 220, 230 to be set to a particular state, either first input port to output port or second input port to output port.

As shown in FIG. 2, in normal operation mode, the first 1×2 switch 210 is set to provide the service input on the first input port to its output port, and the second 1×2 switch 220 is set to provide the protection input on the first input port to its output port. The third 1×2 switch 230 is normally set to provide the service input on its first input port as provided to it by the output port of the first 1×2 switch 210, to its output port. As a result, under normal operation mode, the service path is provided to the primary transmission path optically connected to a receiving node at the output of the third 1×2 switch 230.

When a failure in the service path is determined by the processor 200 due to no (or less than some predetermined threshold) signal strength being detected by the photodetector 240, the third 1×2 switch 230 is switched, under control of the processor 200, to couple the second input port containing signals on the protection path to the output port of the third 1×2 switch 230. This switch effectively maintains the network even when a fiber cut exists on the service path.

However, if the third 1×2 switch 230 is malfunctioning in that it will not allow itself to be set to the second input port-to-output port mode, then the first 1×2 switch 210 may be switched under control of the processor 200 to couple the protection signals received on its second input port to its output port. In this scenario, the protection signals are received on the first input port of the 1×2 switch 200 and then output onto the main optical path coupled to the output of the third 1×2 switch 230.

The system according to the first embodiment can also operate with a malfunction of the first 1×2 switch 210 by switching the second 1×2 switch 220 to provide the proper signal path to the third 1×2 switch 230. Thus, the branch unit 285 according to the second embodiment of the invention is capable of maintaining network integrity even if one of the 1×2 switches 210, 220, 230 fails.

In the first embodiment, a high voltage switch (not shown) is optionally provided at the branch unit 285 so that failed legs can be shorted to ground to allow those failed legs to be repaired, as explained in some detail above. The high voltage switch is preferably commanded by way of the network management system, so that the leg under repair is switched to a load (not shown) coupled to the high voltage switch when the leg is being repaired.

Additionally, a second photodiode, light tap and processor may be provided at the branch units according to any of the embodiments described herein, in order to provide an additional level of redundancy. For each of the embodiments described herein, failure of a service path can be detected very quickly since there are few if any propagation delays, and thus the processor can be notified of (or detect) a problem on a service path and rapidly command a switch to a protection path. Reconfiguration times substantially under a few milliseconds can be achieved from first detection of a failure on a service path, to switching to an appropriate protection path in the first and second embodiments.

As an alternative configuration of the first embodiment shown in FIG. 2, a first photodiode may be provided at the output of the first 1×2 switch 210, and a second photodiode may be provided at the output of the second 1×2 switch 220. The first photodiode monitors switchover to the backup line, and the second photodiode monitors loss of signal in the service line. If the output of the second photodiode goes below a predetermined level (thereby indicating loss of signal in the service line), the first 1×2 switch 210 is switched to provide the protection signal on its output port. The first photodiode monitors the switchover to backup. If, after the first 1×2 switch 210 has been switched, the predetermined level is not met, as determined by the second photodiode, the second and third switches 220, 230 are triggered, to provide the protection signal to the main output path. Additionally, the switchover to the backup or protection signal can be done in the first 1×2 switch 210.

Figure 3:
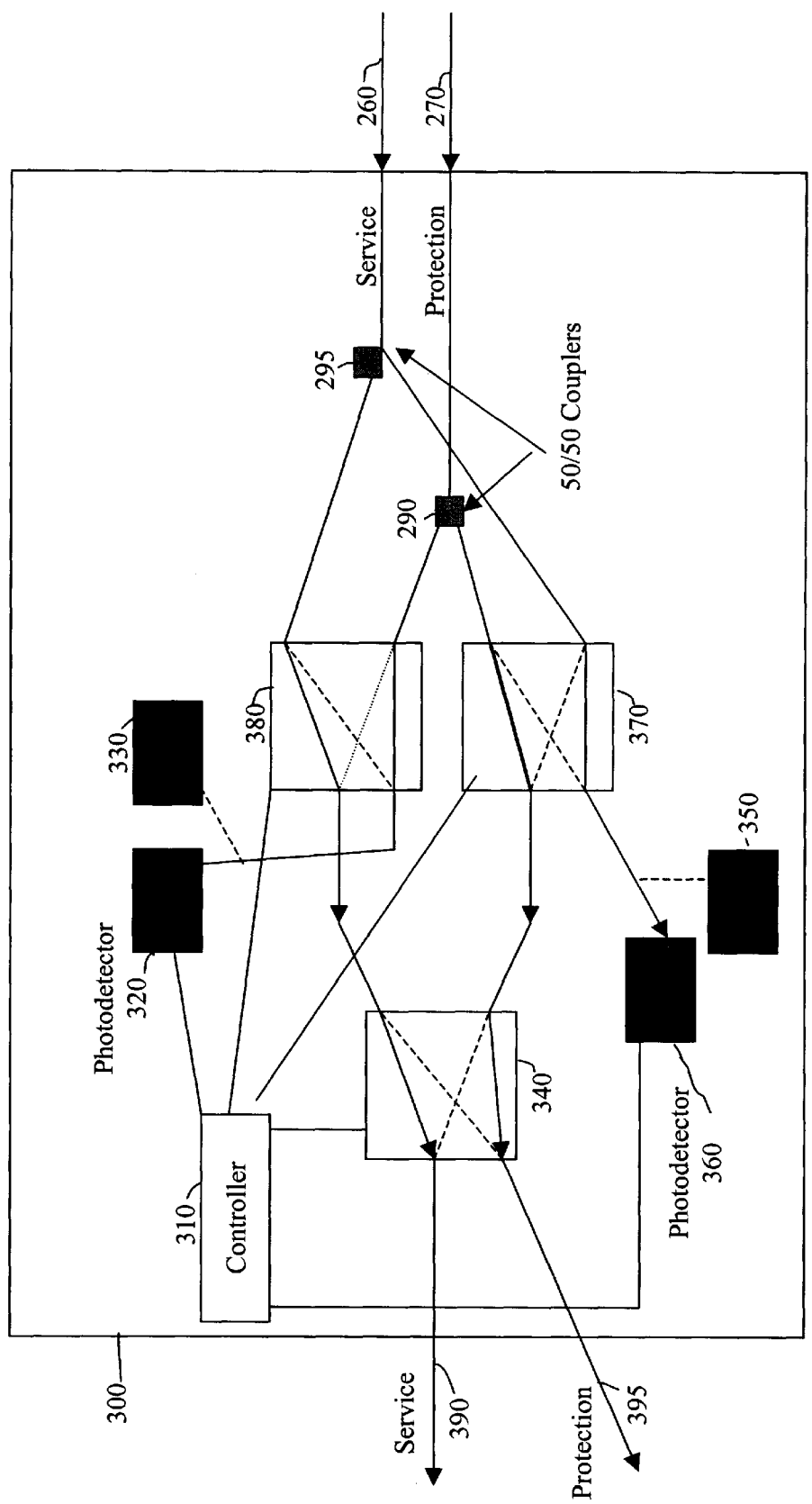
FIG. 3 is a block diagram of a branch unit according to a second embodiment of the invention.

A second embodiment of a fiber optic system is shown by the block diagram of FIG. 3. This second embodiment comprises a redundant 2×2 latching switch architecture for an automatically switched redundant switch structure, utilized in a branch unit 300.

Similar to the first embodiment, service receive optical fiber 260 obtained from a first branch path is optically split via 50/50 optical coupler 295. Split 50/50 service receive optical fiber is optically connected to a first input of a first 2×2 switch 380 and optically connected to a second input of a second 2×2 switch 370. Similarly, protection receive optical fiber 270 obtained from a second branch path is optically split via 50/50 optical coupler 290. Split 50/50 protect receive optical fiber is optically connected to a second input of the first 2×2 switch 380 and optically connected to a first input of the second 2×2 switch 370.

A first output of the first 2×2 switch 380 is provided to a first input of a third 2×2 switch 340, and a second output of the first 2×2 switch 380 is provided to a photodetector 320. A first output of the second 2×2 switch 370 is provided to a second input of a third 2×2 switch 340, and a second output of the second 2×2 switch is provided to a photodetector 360.

A first output of the third 2×2 switch 340 is optically coupled to the primary service transmission path 390. A second output of the third 2×2 switch 340 is optically coupled to the secondary protection transmission path 395.

Under normal operating conditions, a first 2×2 switch 380 receives the service signal on its first input port, and provides that signal to its first output port. A second input port of the first 2×2 switch 380 receives the protection signal, and provides the protection signal to a second output port of the first 2×2 switch 380. A first photodetector 320, for example a photodiode, is provided at the second output port of the first 2×2 switch 380, and is used to monitor switchover to the protection line.

Under normal operating conditions, a second 2×2 switch 370 receives the protection signal received on its first input port and provides that signal to its first output port. A second input port of the second 2×2 switch 370 receives the service signal, and provides the service signal to a second output port of the second 2×2 switch 370. A second photodetector 360, for example a photodiode, is provided at the second output port of the second 2×2 switch 370, and is used to monitor loss of signal in the service path.

Under normal operating conditions, the first output port of the first 2×2 switch 380 is provided to a first input port of a third 2×2 switch 340, and the first output port of the second 2×2 switch 370 is provided to a second input port of the third 2×2 switch 340. The service signal received at the first input port of the third 2×2 switch 340 is provided to a first output port of the third 2×2 switch 340, which corresponds to the main optical path 390. The second output port of the third 2×2 switch 340, which corresponds to the protection optical path 395, under normal operating conditions may be utilized to provide protection data.

As explained above, the second photodiode 360 monitors the service line signal under normal operating conditions, since the service line signal is provided to the second output port of the second 2×2 switch 370 under those conditions. When the second photodiode 370 detects an output level below a predetermined level, thereby indicating a loss of signal in the service line, the controller 310 provides a control signal to the first 2×2 switch 380 so that the protection signal (received at the second input port of the first 2×2 switch 370) is now provided to the first output port of the first 2×2 switch 380. If the switchover of the first 2×2 switch 380 occurs properly, this results in the protection signal being provided to the first input port of the third 2×2 switch 340, and thereby to the main optical path (coupled to the first output port of the third 2×2 switch 340).

The first photodiode 320 monitors the switchover to the protection line. After the first 2×2 switch 380 has been instructed to be switched over, the first photodiode 320 detects whether the second output port of the first 2×2 switch 380 transitions state. If there is a malfunction in the first 2×2 switch 380, the switchover instruction, as provided to the first 2×2 switch 380 by the controller 310, may not have resulted in proper switchover occurring at the first 2×2 switch 380. In that case, the third 2×2 switch 340 would be instructed by the controller 310 to couple its second input port to its first output port, and to couple its first input port to its second output port. This would result in the protection signal, which is provided to the second input port of the third 2×2 switch 340 by way of the second 2×2 switch 370, being provided to the main optical path that is coupled to the first output port of the third 2×2 switch 340. The configuration shown in FIG. 3 also allows for switches 370 and 340 to send service data through an alternate route if first switch 380 fails.

Optional backup photodetectors 330, 350 are also shown in FIG. 3, and are provided in case the primary photodetectors 320, 360 are malfunctioning. Similarly, an optional controller (not shown) may also be provided at the branch unit 300. With the configuration as shown in FIG. 3, a 6–7 dB loss in any one path from the input to the output of the branch unit 300 can be expected due to, for example, the splitters employed therein.

The aforementioned advantages of the first embodiment are also applicable to this second embodiment. Further, this second embodiment may be implemented in various points throughout an optical network to provide line switching in the event of a fiber cut. For example, branch unit 300 may be implemented in Baltimore, Md. between a node in Washington, D.C. and New York, N.Y. In the event of a fiber cut between Baltimore and Washington, branch unit 300 may switch optical fibers for just that section, while not affecting the section from Baltimore, Md. to New York, N.Y. This second embodiment further provides additional line monitoring and may be implemented with different switch technology than employed in the first embodiment.

Figure 4:
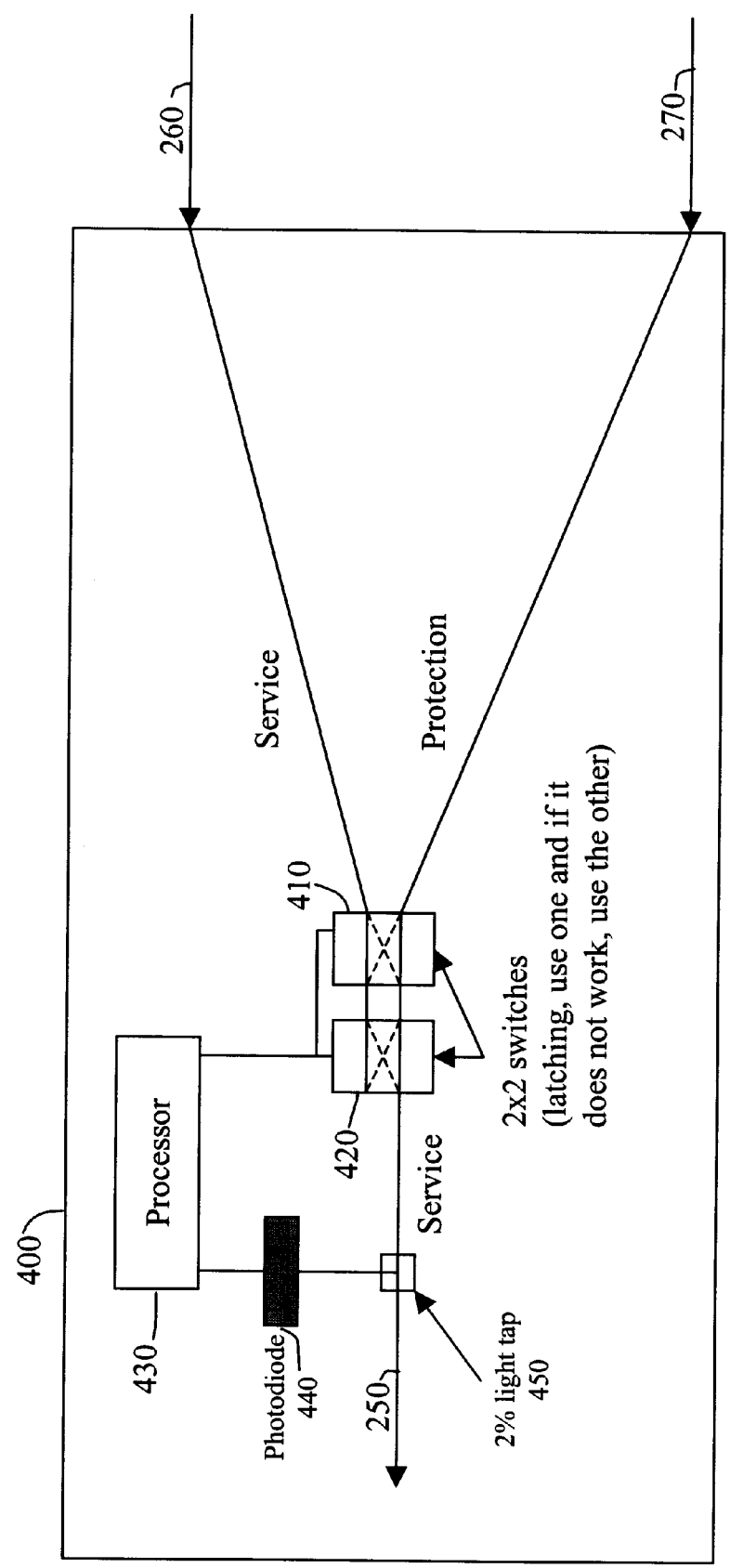
FIG. 4 is a block diagram of a branch unit according to a third embodiment of the invention.

A third embodiment of a fiber optic system is shown by the block diagram of FIG. 4. The branch unit 400 comprises two 2×2 switches 420 and 410. Service receive optical fiber 260 is optically connected to a first input of a first 2×2 switch 410. Protect receive optical fiber 270 is optically connected to a second input of a first 2×2 switch 410. A first output of the first 2×2 switch 410 is optically connected to a first input of a second 2×2 switch 420. A second output of the first 2×2 switch 410 is optically connected to a second input of a second 2×2 switch 420.

In the third embodiment, under normal operating conditions, identical service and protection signals are received via optical fibers 260 and 270, albeit on different input ports, of the first 2×2 switch 410. Thus, the first 2×2 switch 410 receives, on its first input port, the primary or service information signals sent on the first branch path 260. The first 2×2 switch 410 also receives, on its second input port, the backup or protection information signals sent on the second branch path 270. In the preferred implementation of the third embodiment, the first and second 2×2 switches 410, 420 are preferably latching switches, which maintain their most recent switch position even if loss of power occurs.

At least two 2×2 switches 410 and 420 are provided in the branch unit 400 of the third embodiment to handle a case in which one of the 2×2 switches 410, 420 is malfunctioning. In that regard, if the first 2×2 switch 410 is malfunctioning in a manner such that the input from the first input port cannot be switched to the second output port of the first 2×2 switch 410, then the second 2×2 switch 420 is used to provide the proper signal onto primary transmission path 250, which corresponds to the output of the second 2×2 switch 420.

For example, assume that the service or primary signals are provided on the first branch path and that the protection or backup signals are provided on the second branch path. Under normal operating conditions, the first 2×2 switch 410 and the second 2×2 switch 420 are operated so that they are in a straight-through-output, and not-crossed-output, state. That is, the first input port is coupled to the first output port, and the second input port is coupled to the second output port, in the normal, straight-through-output state. As shown in FIG. 4, this means that the service signals received at the second input port of the first 2×2 switch 410 are sent through the second output port of the first 2×2 switch 410, and then to the first input port of the second 2×2 switch 420, then to the output port of the second 2×2 switch 420, with the output port coupled to the main optical path 250.

Now, assume that a problem occurs on the first branch path in that a fiber cut exists somewhere on the first branch path. In that case, no service signals are provided to the second input port of the first 2×2 switch 410 due to the fiber cut on the first branch path, and thus no signals are received at the second output port of the second 2×2 switch 420. The photodetector 440 provides a "no signal" indication to the processor 430, which then reconfigures the first and second 2×2 switches 410, 420 to provide the protection signals on the second branch path to the output port of the second 2×2 switch 420.

This reconfiguration can be done by one of two ways. The first way is to set the first 2×2 switch 410 to a cross-connect mode, whereby the first output port of the first 2×2 switch 10 is coupled to the second input port of the first 2×2 switch 410, and the second output port of the first 2×2 switch 410 is coupled to the first input port of the first 2×2 switch 410. The second 2×2 switch 420 is left in the pass-through, non-cross-connected state. By this reconfiguration of the first 2×2 switch 410, the protection signals received from the second branch path are provided to the first branch path, which corresponds to the output port of the second 2×2 switch 420.

Now, assume that even after this reconfiguration the photodetector 440 still does not detect any signal being received at the output port of the second 2×2 switch 420. In this case, the first 2×2 switch 410 may not have switched over to its cross-coupling mode even though it was instructed to do so by the processor 430. In this case, the second 2×2 switch 420 provides the cross-coupling needed to provide the protection signals to the output port of the second 2×2 switch 420. In particular, when the processor 430 is notified by the photodetector 440 that a signal is still not being received at the output port of the second 2×2 switch 420, even after the processor 440 had instructed the first 2×2 switch 410 to change to a cross-coupling mode, then the processor 430 determines that the first 2×2 switch 410 is malfunctioning, and thereby instructs the second 2×2 switch 420 to operate in the cross-coupling mode. This effectively provides the protection signals to the output port of the second 2×2 switch 420, the output port being coupled to the main optical path 250. Therefore, the first embodiment of the invention provides for non-interrupted service when fiber cuts exist on the first branch path, but also when a 2×2 switch in a branch unit is malfunctioning. An advantage of this configuration is that losses due to splitters in the branch unit can be avoided.

Figure 5:
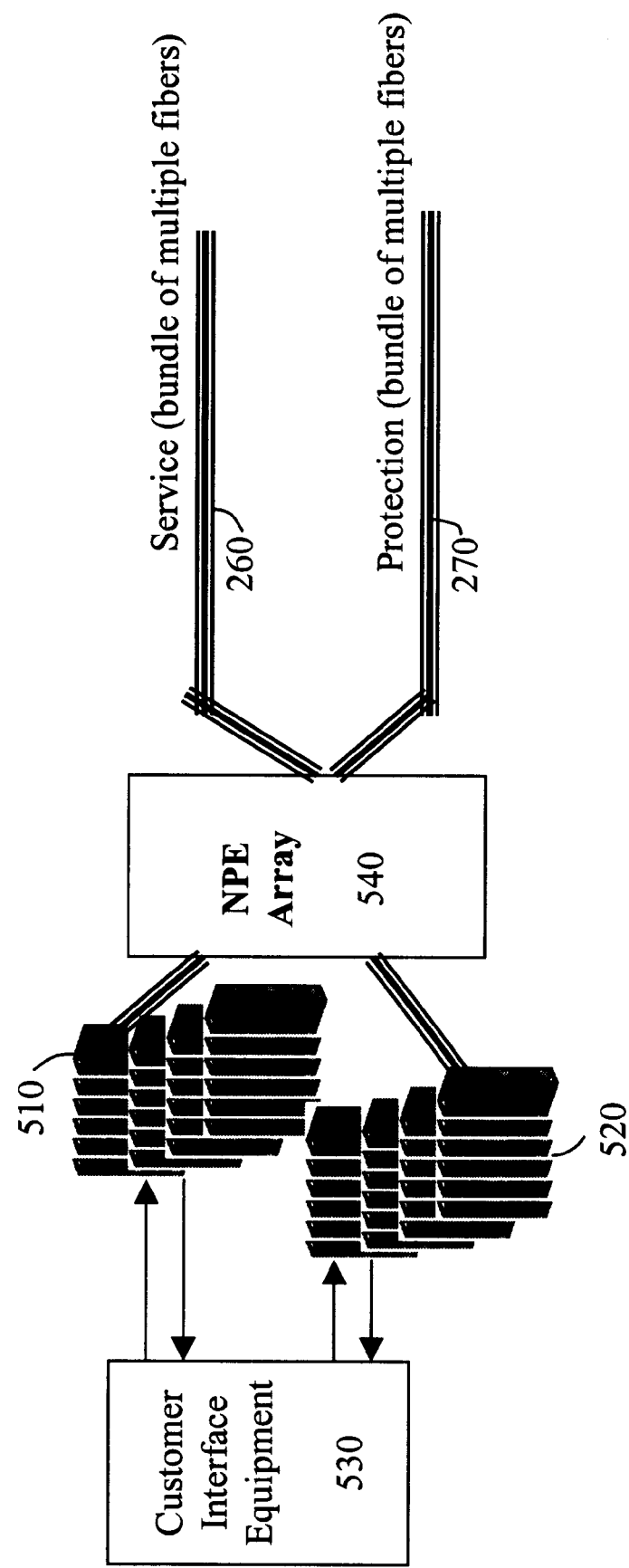
FIG. 5 is a block diagram of a fourth embodiment of a fiber optic system with a WDM network protection equipment (NPE) array.

A fourth embodiment of a fiber optic system is shown by the block diagram of FIG. 5. In this fourth embodiment, network protection equipment (NPE) 540 is provided in optical communication with customer interface equipment 530. NPE 540 comprises an array of branch units as described by any one of the aforementioned embodiments in FIGS. 2–4.

For example, NPE 540 may comprise an array of eight branch units each comprising three switches as described in a first embodiment.

On a transmit and receive side, there is an array of branch units in NPE 540, one for each of the WDM signals to be provided to fiber bays 510 and 520. Each of the array of branch units of NPE 540 has a photodiode detector at the output of the array, to thereby provide information to a processor so as to either switch one or more switches in each array, if there is no signal detected at the output of the array.

Referring now to FIG. 4, which shows a configuration that may be utilized for one WDM signal of NPE 540 according to the fourth embodiment, if the service line for that WDM signal is non-operative, then the output of the 2×2 switch 420 would indicate no signal present, as detected by photodiode 440. This information is provided to processor 430, which provides control signals to switches 420, 410 to provide the protection line for that WDM signal to the output of switch 420.

Similarly, a structure as shown in FIG. 2 or in FIG. 3 may be utilized for each of the WDM signals of NPE 540 according to the fourth embodiment.

As an alternative configuration of the fourth embodiment, one photodiode may be utilized for more than one WDM signal, whereby outputs from a plurality of switches are provided to one photodiode, whereby a light tap from each of those switches is provided to the one photodiode. With this configuration, the photodiode can detect a problem in a group of WDM signals, which may indicate a cut at a group level.

Figure 6:
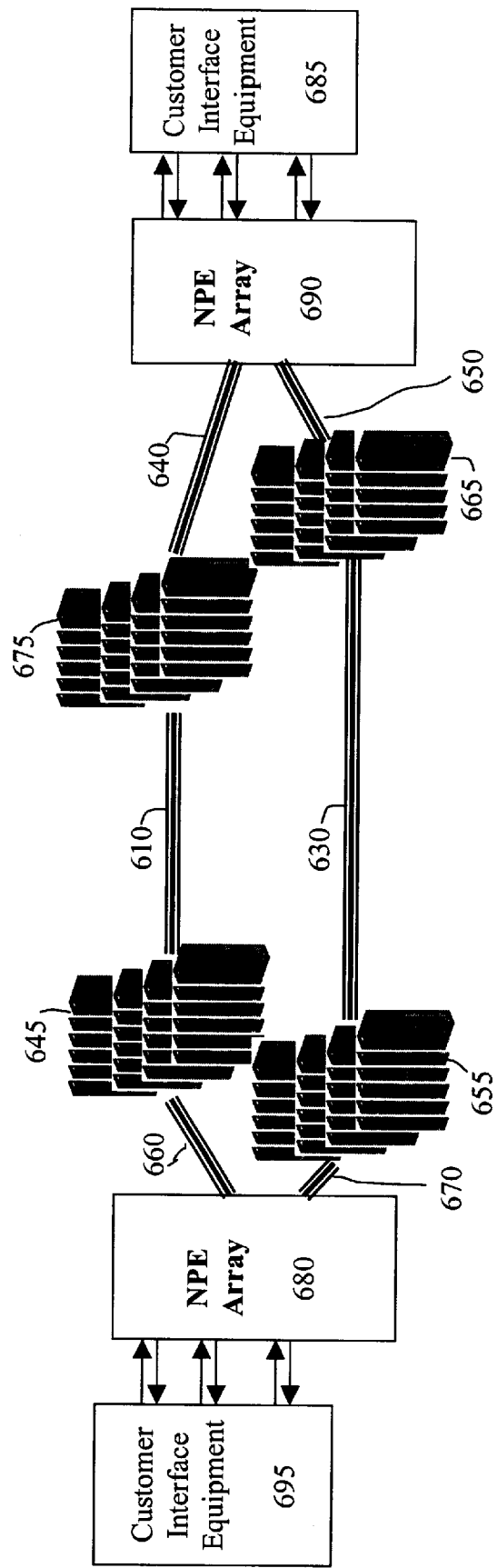
FIG. 6 is a block diagram of a fifth embodiment of a fiber optic system with a NPE array.

A fifth embodiment of a fiber optic system is shown by the block diagram of FIG. 6. NPEs 680 and 690 are provided in optical communication with customer interface equipment (CIE) 695 and 685 respectively. In this fifth embodiment, fiber bays 645 and 675 communicate via service optical fiber 610 and fiber bays 655 and 665 communicate via protect optical fiber 630. Typically fiber bays 645, 675, 655, and 665 transmit and receive WDM signals via optical fibers 610 and 630. Fiber bays 645, 675, 655, and 665 demultiplex the WDM signals to single channel signals which are transmitted and received to NPEs 680 and 690 via optical fibers 660, 670, 640, and 650.

A fiber optic system according to this fifth embodiment is similar in function to that described by the fourth embodiment. The main difference between the two is that the NPEs 680 and 690 of the fifth embodiment operate on single channel signals, whereas NPE 540 of the fourth embodiment operates on WDM signals. Otherwise, the aforementioned description of NPE 540 also applies to NPEs 680 and 690 according to this fifth embodiment.

Figure 7:
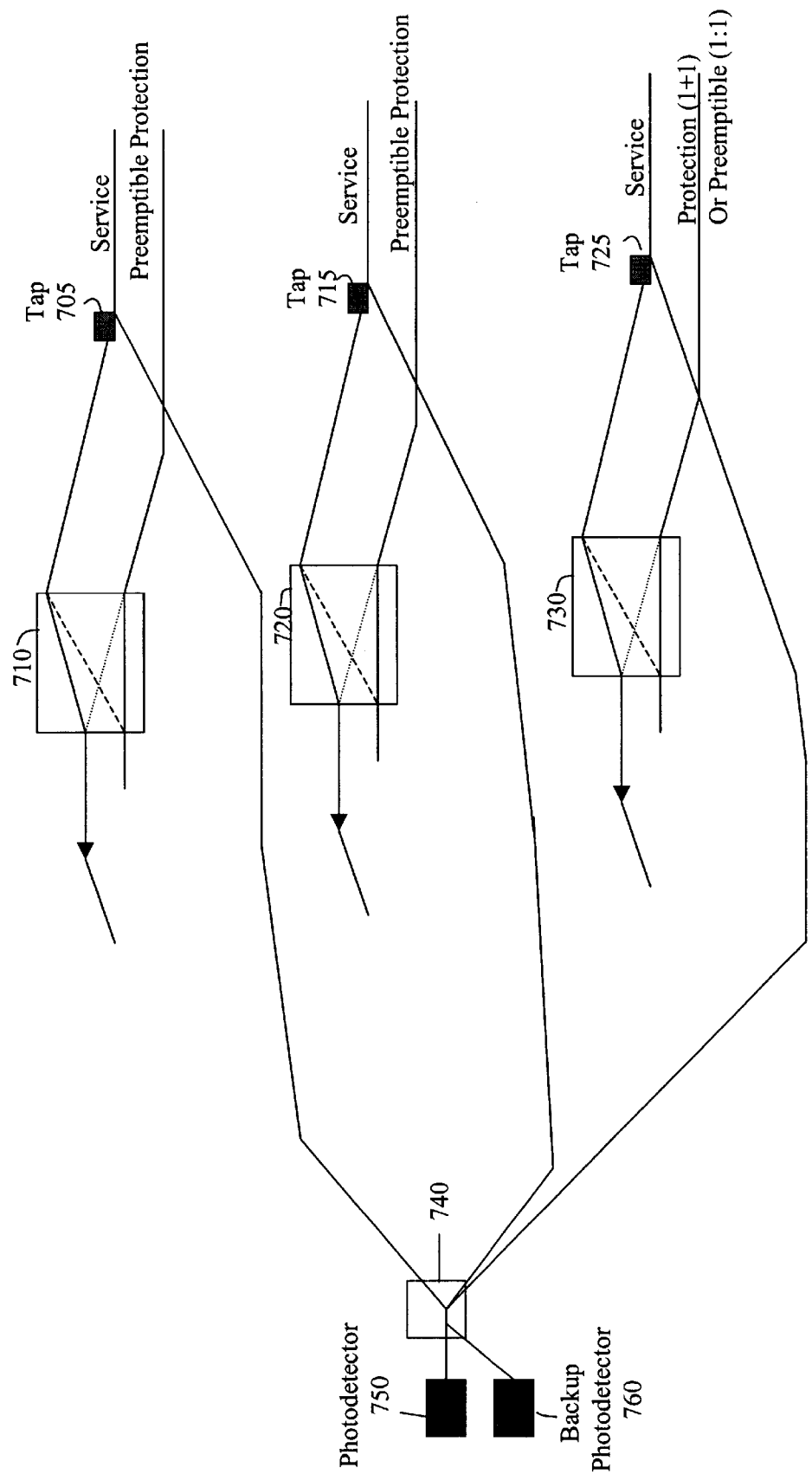
FIG. 7 is a block diagram of a sixth embodiment of a NPE array of switches.

A sixth embodiment of a fiber optic system is shown by the block diagram of FIG. 7. FIG. 7 depicts an array of switches 710, 720 and 730 as may be implemented in an NPE as described in a fourth or fifth embodiment of FIGS. 5 and 6. In this configuration, taps 705, 715, and 725 provide service optical fiber to a first input of switches 710, 720 and 730 as shown. Taps 705, 715, and 725 further provide service optical fiber to combiner 740 which outputs a combined service optical fiber to photodetector 750. The functionality of the switches is similar to that of a second embodiment as shown in FIG. 3, thus only the differences will be further described.

Photodetector 750 may provide information to a processor (not shown) regarding the status of the service optical fiber for a group of switches 710, 720, and 730. When the photodetector detects a drop in optical strength due to signal loss, the processor may control switches 710, 720, and 730 to provide connection via the protect optical fiber.

In a sixth embodiment, taps 705, 715, and 725 have different tap strengths to allow photodetector 750 to tell which service optical fiber has failed. For example, tap 705 may be a 1% tap, tap 715 may be a 5% tap, and tap 725 may be a 10% tap for a combined tap of 16%. When the photodetector 750 detects a 10% loss, the service optical fiber connected to switch 730 has failed and the processor can switch switch 730 to provide connection via the protect optical fiber. Similarly, when the photodetector 750 detects a 6% loss, the service optical fibers connected to switches 710 and 720 have failed and the processor can switch switches 710 and 720 to provide connection via the protect optical fibers. Other configurations, tap percentages, etc. may be employed as would be readily apparent to one skilled in the art. Further, backup photodetector 760 may be provided in case of a failure in photodetector 750.

Figure 8:
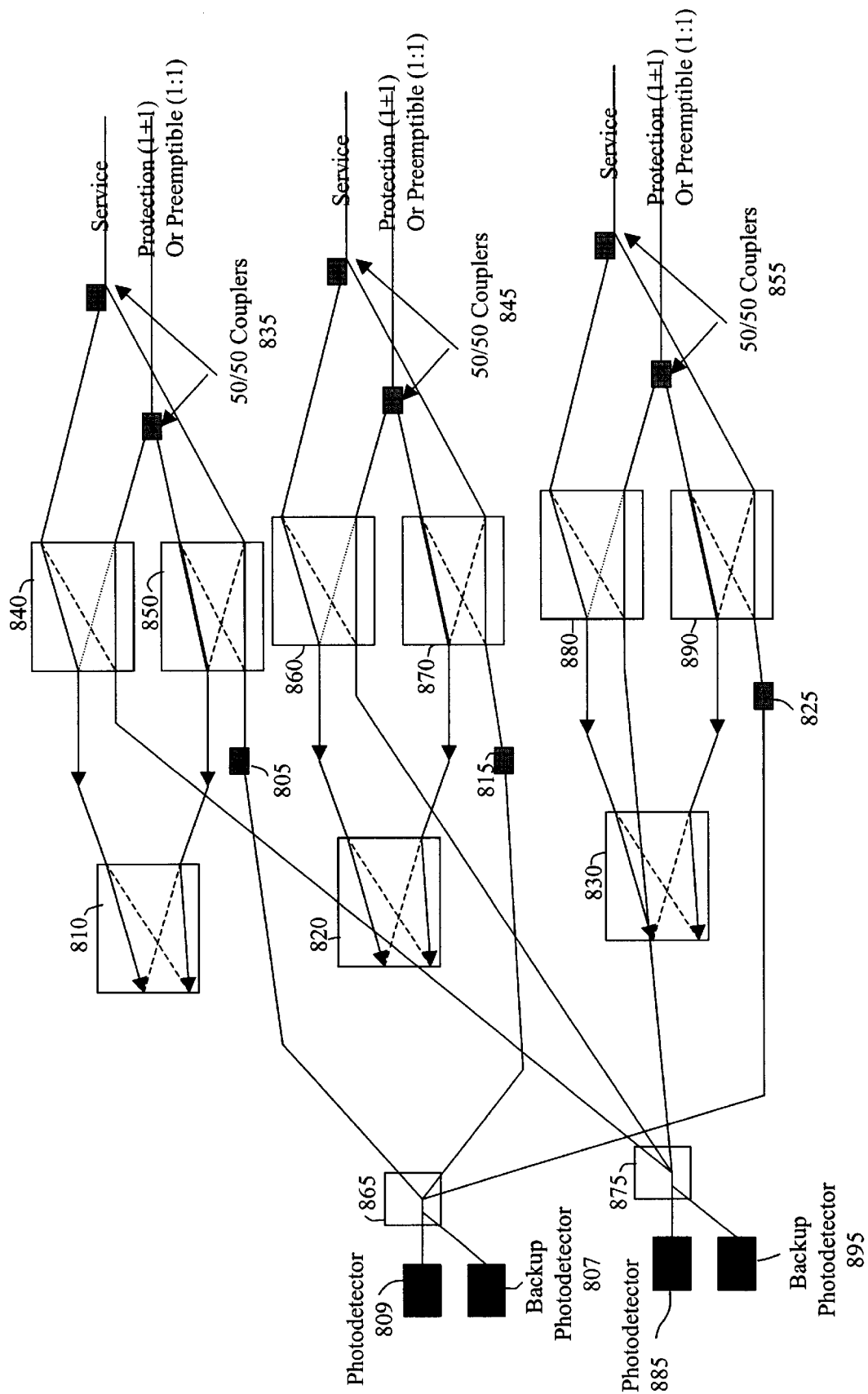
FIG. 8 is a block diagram of a seventh embodiment of a NPE array of switches.

A seventh embodiment of a fiber optic system is shown by the block diagram of FIG. 8. FIG. 8 depicts an array of switches 810, 820, 830, 840, 850, 860, 870, 880, and 890 as may be implemented in an NPE as described in a fourth or fifth embodiment of FIGS. 5 and 6. In this example, branch units comprise three switches 810, 840, and 850 in a first branch unit, 820, 860, and 870 in a second branch unit, and 830, 880, and 890 in a third branch unit similar to the branch unit described in the second embodiment of FIG. 3. Couplers 835, 845, and 855 may be identical to the couplers 290 and 295 in the second embodiment of FIG. 3.

In this seventh embodiment, the second output of switches 850, 870, and 890 are provided to optical combiner 865 which, in turn, provides a combined optical signal to photodector 809. Similarly, the second output of switches 840, 860, and 880 are provided to optical combiner 875 which, in turn, provides a combined optical signal to photodetector 885.

Similar to photodetector 750 in a sixth embodiment of FIG. 7, photodetector 809 detects a failure on service optical fibers connected to switches 850, 870, and 890. When a failure occurs in a service optical fiber, a processor in communication with the photodetector 809 can switch from service optical fiber to protect optical fiber. Similarly, photodetector 885 detects a failure on protect optical fibers connected to switches 840, 860, and 880. When a failure occurs in a protect optical fiber, a processor in communication with the photodetector 885 can notify a user that the protect optical fiber has failed.

Optionally attenuators 805, 815, and 825 may be provided such that the amount of optical light received by combiner 865 from each of the service optical fibers is different. As aforementioned in a sixth embodiment of FIG. 7, using different % attenuators (FIG. 6 similarly used varying % taps), photodetector 809 may be able to detect which of the service optical fibers has failed.

Optionally, attenuators may also be provided on the protect optical fibers. Further, backup photodetectors 807 and 895 may be provided in case of a failure in photodetectors 809 or 885.

A fiber optical architecture has been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. For example, the description of components and units as given above may be utilized for either land-based units or for underwater units. However, as will be appreciated by those skilled in the art, underwater units (e.g., repeaters, switches and branch units) are typically hermetically sealed.

What is claimed is:

1. A fiber optic system, comprising:

a primary transmission path provided from a source;

a secondary transmission path provided from the source;

a network protection unit coupled to the primary and secondary transmission paths provided from the source, the network protection unit comprising:

a first 1×2 switch having a first input optically coupled to said primary transmission path, a second input optically coupled to said secondary transmission path, and an output;

a second 1×2 switch having a second input optically coupled to said primary transmission path, a first input optically coupled to said secondary transmission path, and an output; and a third 1×2 switch having a first input optically coupled to said output of said first switch, a second input optically coupled to said output of said second switch, and an output optically coupled to an output transmission path;

wherein, in a first mode of operation, the first and third switches are set to provide the primary signal to the output transmission path, wherein, in a second mode of operation, the first and third switches are set to provide the secondary signal to the output transmission path, wherein, in a third mode of operation, the second and third switches are set to provide the primary signal to the output transmission path, and wherein, in a fourth mode of operation, the second and third switches are set to provide the secondary signal to the output transmission path.

2. The fiber optic system of claim 1, wherein the fiber optic system is a submersible fiber optic system.

3. The fiber optic system of claim 1, further comprising a photodiode optically connected to a tap of an output of the third 1×2 switch for detecting signal loss.

4. The fiber optic system of claim 3, further comprising a controller in communication with the photodiode for controlling the first 1×2 switch, second 1×2 switch, and third 1×2 switch, wherein when the photodiode detects a signal loss, the controller switches at least one of the three 1×2 switches.

5. The fiber optic system of claim 4, wherein the fiber optic system automatically switches when a loss of signal in a transmission path occurs.

6. The fiber optic system of claim 1, further comprising an array of switches in a network protection equipment.

7. The fiber optic system of claim 6, further comprising at least one photodiode for monitoring the output of multiple switches.

8. The fiber optic system of claim 7, further comprising at least one attenuator per switch, wherein each one of the attenuators has a different attenuation, and wherein the photodiode switches a failed switch based on the loss detected attributable to that switch's attenuator.

9. A fiber optic system, comprising:

a primary transmission path provided from a source;

a backup transmission path provided from the source;

a branch unit provided at a meeting point of the primary and backup transmission paths, the branch unit comprising:

a first 2×2 switch having a first input optically coupled to said primary transmission path, a second input optically coupled to said secondary transmission path, a first output, and a second output optically connected to a detector;

a second 2×2 switch having a second input optically coupled to said primary transmission path, a first input optically coupled to said secondary transmission path, a first output, and a second output optically coupled to a detector;

a third 2×2 switch having a first input optically coupled to said first output of said first 2×2 switch, a second input optically coupled to said first output of said second 2×2 switch; a first output, and a second output; and a processor for receiving information from the detectors regarding the detected signal strength at the second output port of the first 2×2 switch and the second 2×2 switch, wherein the first 2×2 switch operates in either a first mode that provides input received on its first input to its first output and input received on its second input to its second output, or a second mode that provides input received on its first input to its second output and input received on its second input to its first output, wherein the second 2×2 switch operates in either a first mode that provides input received on its first input to its first output and input received on its second input to its second output, or a second mode that provides input received on its first input to its second output and input received on its second input to its first output, and wherein the processor commands the first and second 2×2 switches to operate in one of the first mode of operation and the second mode of operation, based on the information received from the detectors.

10. The fiber optic system according to claim 9, wherein the fiber optic system is a submersible fiber optic system.

11. The fiber optic system of claim 9, wherein the fiber optic system automatically switches when a loss of signal in a transmission path occurs.

12. The fiber optic system of claim 9, further comprising an array of switches in a network protection equipment.

13. The fiber optic system of claim 12, further comprising at least one photodiode for monitoring the output of multiple switches.

14. The fiber optic system of claim 13, further comprising at least one attenuator per switch, wherein each one of the attenuators has a different attenuation, and wherein the photodiode switches a failed switch based on the loss detected attributable to that switch's attenuator.

15. A fiber optic system, comprising:

a primary transmission path provided from a source;

a backup transmission path provided from the source;

a branch unit provided at a meeting point of the primary and backup transmission paths, the branch unit comprising:

a first 2×2 switch having a first input optically coupled to said primary transmission path, a second input optically coupled to said secondary transmission path, a first output, and a second output;

a second 2×2 switch having a first input optically coupled to said first output of said first 2×2 switch, a second input optically coupled to said second output of said second 2×2 switch, and an output optically coupled to a main transmission path;

a detector optically coupled to an output of said second 2×2 switch; and a processor in communication with said detector for controlling said first 2×2 switch and said second 2×2 switch, wherein the first 2×2 switch operates in either a first mode that provides input received on its first input to its first output and input received on its second input to its second output, or a second mode that provides input received on its first input to its second output and input received on its second input to its first output, wherein the second 2×2 switch operates in either a first mode that provides input received on its first input to an output, or a second mode that provides input received on its second input to an output, and wherein the processor commands the first 2×2 switch and second 2×2 switch to operate in one of the first mode of operation and the second mode of operation, based on the information received from the detector.

16. The fiber optic system according to claim 15, wherein the fiber optic system is a submersible fiber optic system.

17. The fiber optic system of claim 15, wherein the fiber optic system automatically switches when a loss of signal in a transmission path occurs.

18. The fiber optic system of claim 15, further comprising an array of switches in a network protection equipment.

19. The fiber optic system of claim 18, further comprising at least one photodiode for monitoring the output of multiple switches.

20. The fiber optic system of claim 19, further comprising at least one attenuator per switch, wherein each one of the attenuators has a different attenuation, and wherein the photodiode switches a failed switch based on the loss detected attributable to that switch's attenuator.

21. A method of providing fiber optic signals on a fiber optical network, the method comprising:

providing, from a source, a primary signal on a primary transmission path;

providing, from the source, a backup signal on a backup transmission path;

receiving the primary and backup signals on the primary and backup transmission paths, respectively, and outputting only one of the primary and backup signals onto an output port that corresponds to a main optical path, by way of at least two switches;

detecting a signal characteristic on the main optical path; and determining, based on said signal characteristic, whether to operate in a first mode of operation, in which the primary signal is provided to the main optical path, or in second mode of operation, in which the backup signal is provided to the main optical path.

22. The method of claim 21, wherein the fiber optical network is a submersible fiber optical network.

23. The method of claim 21, wherein said signal characteristic is signal quality.

24. The method of claim 21, wherein said signal characteristic is signal strength.

25. An optical communication system comprising:

a source for providing a primary optical signal on a primary transmission path and a backup optical signal on a backup transmission path;

a branch unit for receiving said primary optical signal and said backup optical signal and for selectively switching one of said primary optical signal and said backup optical signal onto a main optical path, wherein said selection of said primary optical signal and said backup optical signal is made based upon a measurement taken along are of said primary, backup and main optical paths, wherein said branch unit includes at least three switches and a controller.

* * * * *